United States Patent
Werkheiser et al.

(10) Patent No.: US 11,802,850 B2
(45) Date of Patent: Oct. 31, 2023

(54) MAGNETIC PERMEABILITY SENSOR WITH PERMANENT MAGNET FOR DOWNHOLE SENSING

(71) Applicant: Halliburton Energy Services, Inc., Houston, TX (US)

(72) Inventors: Gregory Thomas Werkheiser, Carrollton, TX (US); Michael Linley Fripp, Carrollton, TX (US); Jinhua Cao, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 333 days.

(21) Appl. No.: 17/009,546

(22) Filed: Sep. 1, 2020

(65) Prior Publication Data
US 2022/0065818 A1    Mar. 3, 2022

(51) Int. Cl.
*G01N 27/74* (2006.01)
*G01N 15/08* (2006.01)
*E21B 34/06* (2006.01)

(52) U.S. Cl.
CPC ......... *G01N 27/74* (2013.01); *G01N 15/0806* (2013.01); *E21B 34/066* (2013.01)

(58) Field of Classification Search
None
See application file for complete search history.

(56) References Cited

U.S. PATENT DOCUMENTS

| | | | |
|---|---|---|---|
| 9,506,324 B2 | 11/2016 | Kyle et al. | |
| 9,587,486 B2 | 3/2017 | Walton et al. | |
| 9,920,620 B2 | 3/2018 | Murphree et al. | |
| 10,221,653 B2 | 3/2019 | Walton et al. | |
| 2003/0029611 A1* | 2/2003 | Owens | E21B 33/14 166/250.03 |
| 2003/0192695 A1* | 10/2003 | Dillenbeck | E21B 33/05 166/285 |
| 2013/0048290 A1 | 2/2013 | Howell et al. | |
| 2013/0048291 A1* | 2/2013 | Merron | E21B 43/26 166/305.1 |
| 2013/0264051 A1* | 10/2013 | Kyle | E21B 23/00 166/66.5 |
| 2016/0258280 A1* | 9/2016 | Murphree | E21B 47/12 |
| 2017/0204719 A1 | 7/2017 | Babakhani | |
| 2018/0030824 A1 | 2/2018 | Roberson et al. | |
| 2019/0249549 A1 | 8/2019 | Fripp et al. | |

OTHER PUBLICATIONS

PCT Application No. PCT/US2020/048989; Search Report: dated May 17, 2021, 4 pages.
PCT Application No. PCT/US2020/048989; Written Opinion; dated May 17, 2021, 6 pages.

* cited by examiner

*Primary Examiner* — Jermele M Hollington
*Assistant Examiner* — Suresh K Rajaputra
(74) *Attorney, Agent, or Firm* — DELIZIO, PEACOCK, LEWIN & GUERRA

(57) ABSTRACT

A sensing apparatus in the present disclosure is configured to measure magnetic flux of a magnetic field generated by a magnetic source and flowing through a sample slurry to determine magnetic permeability of the sample slurry. The sensing apparatus comprises a magnetic sensor inside a sensor housing that measures magnetic flux through a sensor housing made of a ferromagnetic material. The magnetic sensor sends measurements of the magnetic flux to a computing device that determines the presence of cementing fluids in the slurry based on the magnetic flux measurements.

20 Claims, 9 Drawing Sheets

MAGNETIC PERMEABILITY SENSOR WITH PERMANENT MAGNET FOR DOWNHOLE SENSING

TECHNICAL FIELD

The disclosure generally relates to the field of equipment utilized and operations performed in conjunction with a subterranean well and to magnetic sensing in well tools.

BACKGROUND

Reverse circulation cementing (hereinafter "reverse cementing") involves displacing fluids between the outside of a casing and a formation wall in a subterranean well operation. A sensor on the inner or outer diameter of the casing at or near the bottom of the wellbore detects when the cementing fluids reach the bottom of the wellbore and begin entering the inside of the casing through a flow port. In response, a signal is sent downhole to close a valve to prevent cementing fluids from ascending the inside of the casing. During reverse cementing operations, the cementing fluids are aided by gravity in reaching the bottom of the wellbore.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to measuring magnetic permeability of slurry during a reverse cementing operation in illustrative examples. Embodiments of this disclosure can be instead applied to measuring magnetic permeability of fluids or slurries during other subterranean wellbore operations including traditional cementing operations. In other instances, well-known instruction instances, protocols, structures, and techniques have not been shown in detail in order not to obfuscate the description.

Overview

A low-cost magnetic permeability sensing apparatus ("sensing apparatus") that can withstand hostile subterranean environments is disclosed herein for activating devices downhole based on magnetic permeability sensing, including activating a valve during reverse cementing operations. At designated stages of reverse cementing operations, a material with high magnetic permeability is added to a slurry to be sent downhole to enable a magnetic sensor to detect the magnetic permeability of the slurry. The sensing apparatus is situated downhole near a flow port to detect the presence of a slurry with known magnetic permeability corresponding to the slurry sent downhole and to send a signal to close a valve (e.g., a sliding sleeve, ball valve, etc.) either at the flow port or across the cross section of an oilfield tubular. Once the known slurry is detected, an additional signal (e.g., a wired signal like through electric line or fiber optics, or a wireless signal such as a pressure rise, an acoustic signal, or the like) is sent by the sensing apparatus to a controller of the reverse cementing operations at the surface to stop flow of the current slurry and/or commence flow of a different slurry. In one application, the additional signal is a pressure rise associated with the increased flow resistance from the valve closing. The sensing apparatus comprises a magnet source (e.g., a permanent magnet or an electromagnet) and a magnetic sensor. The sensing apparatus is configured to detect specific ranges of magnetic permeability by inducing a magnetic field in the slurry to be read by the magnetic sensor. The magnetic sensor detects different slurries downhole based on different concentrations of the high magnetic permeability material in the slurry which results in magnetic fields with different strengths at the sensor. This sensing apparatus can be constructed from low cost materials even for operational conditions downhole and detects multiple types of cementing fluids using accurate measurements of magnetic permeability.

Example Illustrations

Figure 1:
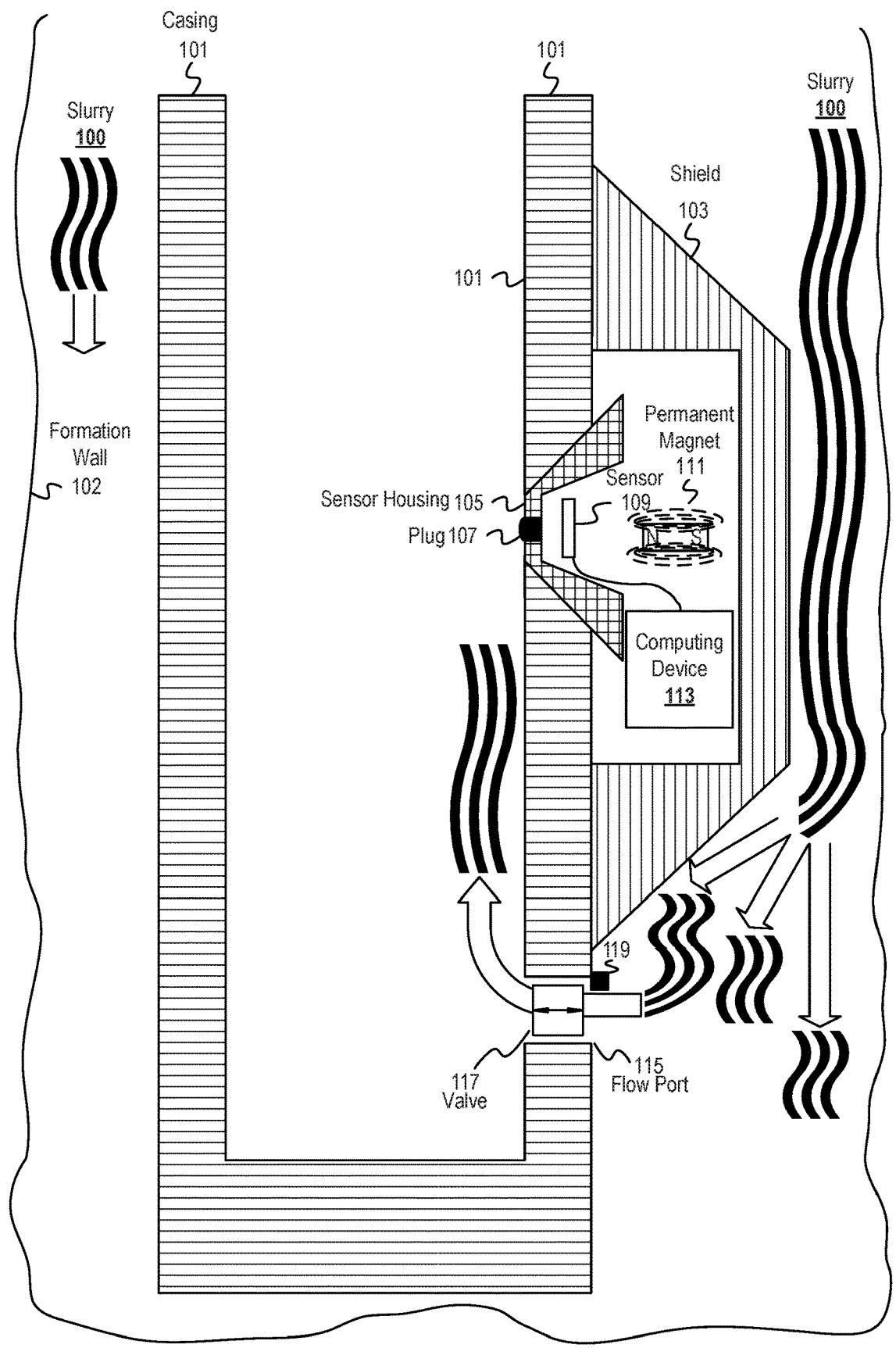
FIG. 1 is a schematic diagram of a magnetic permeability sensor in a reverse cementing operation with a permanent magnetic field.

FIG. 1 is a schematic diagram of a magnetic permeability sensing apparatus with a permanent magnet. During reverse cementing operations, a slurry 100 of cementing fluids flows outside an oilfield tubular 101, adjacent to a formation wall 102, and into a flow port 115 after which it is detected by the sensing apparatus. The sensing apparatus comprises a permanent magnet 111, a magnetic sensor 109, a computing device 113 coupled to the magnetic sensor 109, and a sensor housing 105 comprising an optional plug 107 made of a non-ferromagnetic material. The illustrated sensing apparatus also comprises a shield 103 that protects the sensing apparatus from the slurry 100 on the outside of the oilfield tubular 101. The magnetic sensor 109 is situated between the permanent magnet 111 and the sensor housing 105. In alternate embodiments, the magnetic sensor 109 is placed anywhere in the magnetic flux path. The permanent magnet 111 is mechanically connected to the shield 103 (e.g., with an adhesive, magnetic attraction, threaded, press fit, etc.), to the sensor housing 105, or to the magnetic sensor 109 and positioned within the sensor housing 105 to induce a magnetic field outside of the sensor housing 105 into the interior of the oilfield tubular 101. The magnetic sensor 109 can be mechanically connected to the plug 107, the shield 103, the permanent magnet 111, or to the sensor housing 105 (e.g., with a fixture, adhesive, threaded connection, press fit, adhesive, etc.). The sensing apparatus is attached to or integrated into the oilfield tubular 101 and positioned so that the plug 107 creates a window to the interior of the oilfield tubular 101. The sensor housing 105 is positioned near the flow port 115 so that the presence of the slurry 100 is detected as the slurry 100 enters the interior of the oilfield tubular 101. In some cases, there is no separate plug 107 because the entire sensor housing 105 is non-ferromagnetic and serves as a magnetic window for the magnetic field. The window created by the plug 107 allows the magnetic sensor 109 to measure the magnetic permeability of the slurry 100 outside of the sensor housing 105, which experiences the magnetic field induced by the permanent magnet 111 through the plug 107 as it flows past the sensing apparatus. Once a permeability change from the cementing fluid is detected, the computing device 113 sends a signal to an actuating mechanism 119 to close a valve 117 at a flow port 115 in the oilfield tubular 101. The sensing apparatus pictured in FIG. 1 is integrated into the oilfield tubular 101 prior to deployment downhole and can be powered on deployment of the oilfield tubular 101 to preserve battery power.

The plug 107 comprises any low-cost non-ferromagnetic material that allows the passage of the magnetic field (i.e. has low magnetic permeability) of the permanent magnet 111 as it passes through the plug 107 and into the slurry 100. For instance, the non-ferromagnetic material can be steel, titanium, aluminum, any alloys thereof such as INCONEL® alloy 718, plastics, composites, ceramics, glass, etc. The sensor housing 105 and shield 103 comprise any low-cost material that can protect the sensing apparatus under operational conditions (e.g., carbon steel, steel alloys, et cetera). The magnetic sensor 109 can be any sensor that detects the strength of a magnetic field or magnetic flux such as a giant magnetoresistance (GMR) sensor, Hall effect sensor, a microelectromechanical magnetic field sensor, magnetic force sensor, etc. The magnetic force sensor will be described during the exposition of FIG. 3. The measurements taken by the magnetic sensor 109 will increase in strength as the magnetic permeability of the slurry 100 increases due to the increased concentration of a high magnetic permeability material in the slurry 100. The slurry 100 comprises a detection slurry having a plurality of particles with a high magnetic permeability such as suspended iron particles, martensitic stainless-steel particles, ferritic particles, iron oxide particles, ferrofluid particles, or other particles with a high magnetic permeability in a fluid. As the magnetic permeability of the slurry 100 increases, the magnetic flux detected by the magnetic sensor 109 increases. In some applications, the particle size is between 1 nm and 2 mm.

In some applications, the computing device 113 can be calibrated to detect ranges or differences of magnetic permeability for the slurry 100. The accuracy of the calibration can be increased by simulating downhole conditions (temperature, pressure, flow rate, etc.) with different cementing fluids having different magnetic permeability. The computing device 113 can be programmed to detect each cementing fluid based on the magnetic strength measured by the magnetic sensor 109 during calibration. Once the computing device 113 detects a cementing fluid in the slurry 100, it sends a signal to the actuating mechanism 119 at the flow port 115 to stop fluid flow. In some embodiments, the computing device 113 may include a time delay before sending the signal to the actuating mechanism 119. Detection occurs when the computing device 113 determines that the measurements taken by the magnetic sensor 109 satisfy a detection criterion. This detection criterion can be that the magnetic flux is in a predetermined range as described above or that the magnetic field changes by a predetermined amount, indicating that a fluid of a different magnetic permeability is present (the amount of magnetic field can also be pre-calibrated). In response to a signal to stop fluid flow, the actuating mechanism 119 causes the valve 117 to close over the flow port 115 or across the diameter of the inside of the oilfield tubular 101. This valve 117 can be a sliding sleeve, a flapper, a ball valve, or any valve that can stop or can variably restrict fluid flow into the inside of the oilfield tubular 101 at operational conditions downhole. The valve 117 can be actuated by opening a flow port that allows the sleeve to shift into a closed position. For example, the sliding sleeve can be hydraulically locked in the open position and the actuation of an electronic rupture disc removes the hydraulic lock and allows the sleeve to close. The actuating mechanism 119 can be open or close a flow valve and this change in restriction in the valve results in a change in the flow port (either increased or decreased flow). In another application, the valve is on the inner diameter (ID) of the tubing and prevents axial flow up the tubing. In these applications, the valve on the ID of the tubing may be a ball valve or a flapper valve. In yet another application, the valve is on the outer diameter (OD) of the tubing and prevents axial flow down the annular space between the tubing and the formation. In this application, the valve on the OD of the tubing may be a packer.

Although depicted as a magnet, the permanent magnet 111 can be any source of magnetic flux and, in some embodiments, can be an electromagnet. For embodiments where the permanent magnet 111 is an electromagnet, the magnetic sensor 109 can detect inductance on the electromagnet (i.e. the electromagnet itself is the sensor) because the inductance of the electromagnet will vary with the magnetic permeability of the slurry 100. For instance, a capacitor placed in electrical series with the electromagnet will resonate at a frequency of $1/\sqrt{LC}$ hertz, where L is the inductance and C is the capacitance. Therefore, the magnetic permeability of the slurry 100 influences the resonant frequency of this circuit. The resonant frequency of the circuit can be measured, for example, by applying an electrical voltage pulse to the electromagnet, measuring the frequency of the induced voltage oscillations, and sending the frequency measurements to the computing device 113. The computing device can be pre-calibrated to detect ranges of resonant frequencies corresponding to different cementing fluids, or to detect changes in the resonant frequency that indicates a change of fluid downhole.

Figure 2:
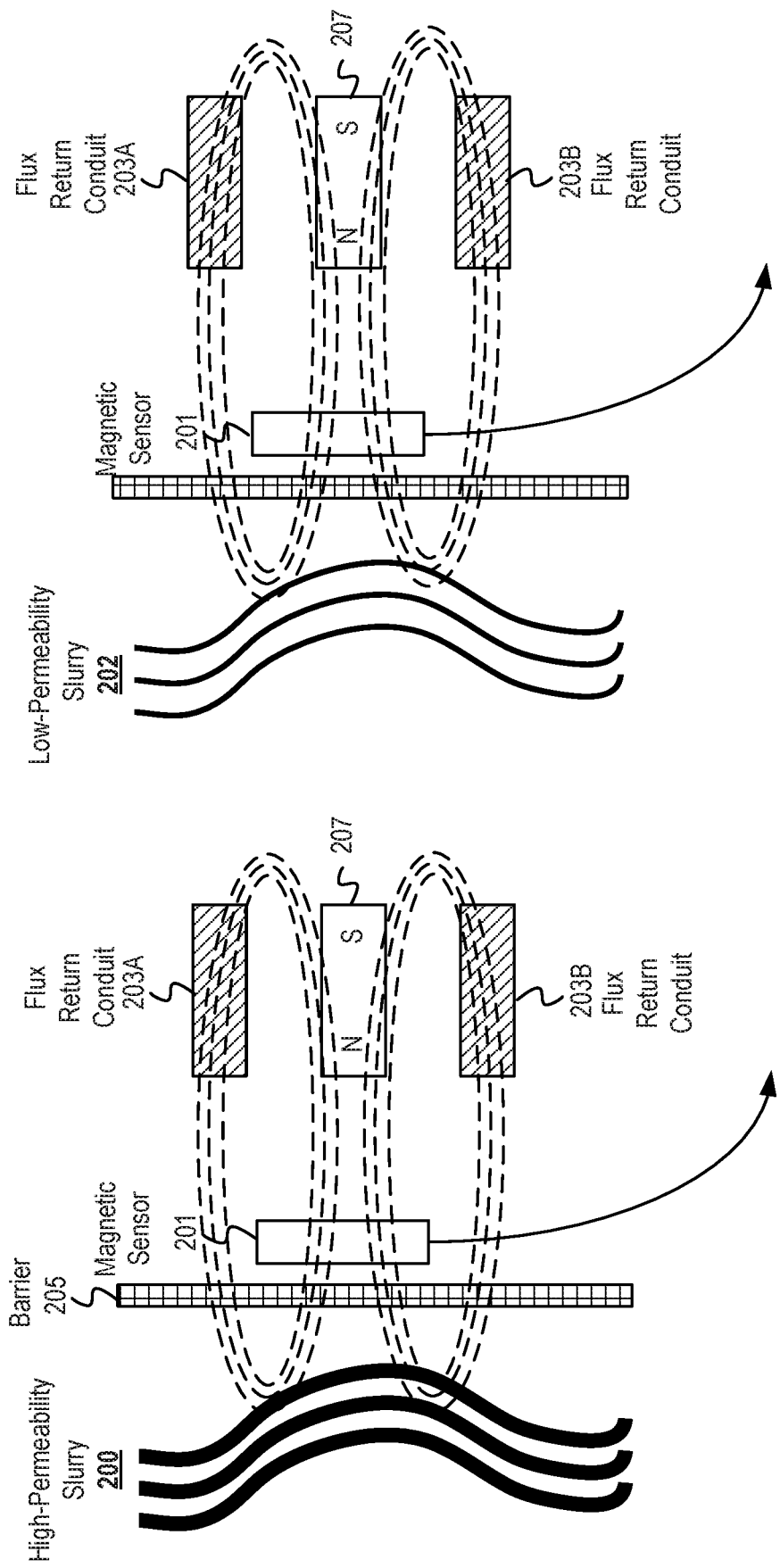
FIG. 2 is a schematic diagram of a magnetic field sensor for detecting slurries with varying concentrations of high magnetic permeability materials with a permanent magnet.

FIG. 2 is a schematic diagram of using a magnetic source (permanent magnet or an electromagnet) with a magnetic sensor for detecting slurries with varying concentrations of high magnetic permeability materials. A magnetic sensor 201 detects a high-permeability slurry 200 and a low-permeability slurry 202 via a magnetic field generated by a permanent magnet 207 that flows through a barrier 205 and is guided by flux return conduits 203A and 203B. The high-permeability slurry 200 comprises a cementing fluid that has been modified by adding a high magnetic permeability material such as an iron powder to distinguish it from the low-permeability slurry 202. The low-permeability slurry 202 can be a distinct cementing fluid from the high-permeability slurry 200 or can be an ambient fluid downhole (e.g., a completion brine or a drill mud). Typically, downhole fluids such as the low-permeability slurry 202 have a relative magnetic permeability $\mu_1$ of approximately 1, whereas the high-permeability slurry 200 has a higher relative magnetic permeability $\mu_2$ (e.g., 2 or greater) due to the addition of a ferromagnetic material. More than two cementing fluids corresponding to more than two magnetic permeability values are possible. The cementing fluids can be a cement, a spacer, a brine, a gel, a mud, or other fluids used in the cementing process.

The barrier 205 is made of a non-ferromagnetic material (e.g. austenitic steel, titanium, polymers, composites, aluminum, any alloys thereof such as INCONEL® alloy, etc.) so that it doesn't interfere with the magnetic field generated by the permanent magnet 207. The flux return conduits 203A and 203B are made of a ferromagnetic material and guide the magnetic field generated by the permanent magnet 207 in the direction of the magnetic sensor 201. When the slurry has a high magnetic permeability, such as the high-permeability slurry 200, an increased amount of the magnetic field will flow through the high-permeability slurry 200 and to the magnetic sensor 201, which will have a higher reading. Prior to deployment, the magnetic sensor 201 can be configured to detect ranges of magnetic strength (i.e. determine that measurement satisfy a detection criterion) for both the high-permeability slurry 200 and the low-permeability slurry 202 for the particular configuration of the barrier 205, the permanent magnet 207, and the flux return conduits 203A and 203B relative to the slurry at operational conditions downhole. Alternatively, the magnetic sensor 201 can be configured to detect a change in flux of the measured magnetic field sufficiently large to indicate the presence or absence of a cementing fluid. The magnetic sensor 201 is communicatively coupled to a computing device (not shown) that sends a signal to an actuating mechanism (not shown) that enables a valve to close that prevents flow or restricts flow of the slurry in response to the detection of a cementing fluid. The high-permeability slurry 200 and low-permeability slurry 202 can be inside an oilfield tubular or outside an oilfield tubular facing a formation wall, sufficiently close to a flow port to detect cementing fluid and send a signal to the actuating mechanism to stop fluid flow before or shortly after cementing fluid starts to run up the inside of the oilfield tubular.

Figure 3:
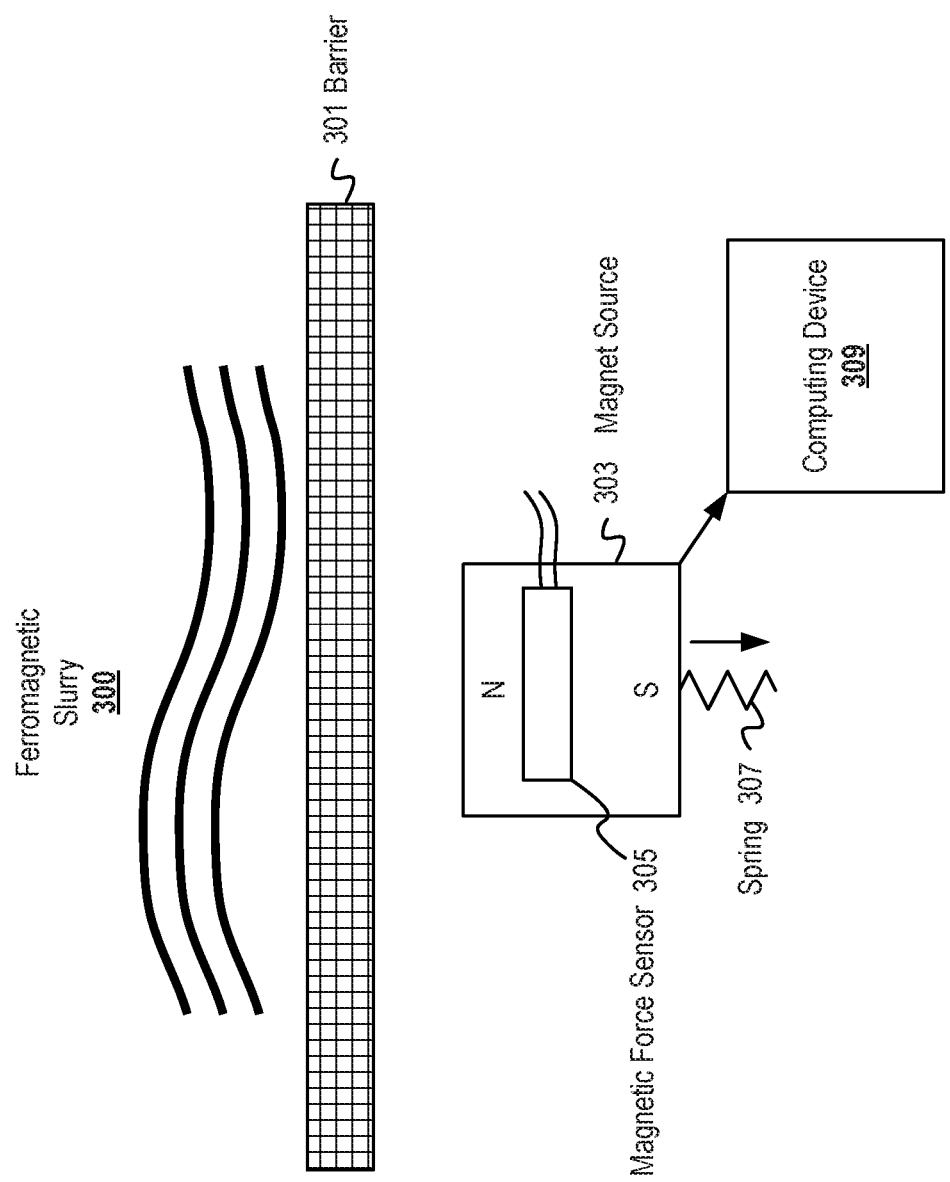
FIG. 3 is a schematic diagram of a permanent magnet with a tension measuring device to measure magnetic permeability of a slurry.

FIG. 3 is a schematic diagram of a magnet source with a magnetic sensor for measuring magnetic permeability of a slurry where the magnetic sensor is a magnetic force sensor. A magnet source 303 (e.g., a permanent magnet or an electromagnet) generates a magnetic field that flows through a barrier 301 to a slurry 300 and returns through the barrier 301 to the magnet source 303. When the slurry 300 has a high magnetic permeability, the magnet source 303 experiences an attractive force towards the slurry 300 that is measured by a magnetic force sensor 305. A spring 307 counteracts the attractive force acting on the magnet source 303 due to the increased magnetic field passing through the higher permeability fluid. The spring 307 keeps the magnet source 303 in place as indicated by the downwards arrow in FIG. 3. The magnetic force sensor 305 is communicatively coupled to a computing device 309 that receives tension measurements from the magnetic force sensor 305.

Although depicted as a spring 307, the magnetic source 303 can be affixed to a shield or housing, affixed to the barrier 301, or affixed to any other stationary component, or the spring 307 can be integrated into any other component that adds an opposing (downward) force to the magnet source 303. In some embodiments the spring 307 is replaced with another magnet, or with the stiffness of the magnetic force sensor 305. A compression measuring device could be used as a variation on the tension measurement device.

Instead of the single magnet source 303, two magnets can be implemented with the magnetic force sensor 305 between them. Alternatively, a piece of iron or other ferromagnetic material can be placed under the magnetic force sensor 305 and the magnetic source 303 can be situated on top towards the ferromagnetic slurry 300. These embodiments allow the magnetic source 303 to be situated closer to the ferromagnetic slurry 300, resulting in a higher sensitivity to force of the magnetic flux through the ferromagnetic slurry 300.

The magnetic force sensor 305 can be any device that can measure the strength of the attractive force on the magnetic source 303. For example, the tension measuring device can comprise four strain gauges in a Wheatstone bridge configuration. The barrier 301 can be made of a non-ferromagnetic material, as described variously above. The computing device 309 is configured to detect the magnetic permeability of the ferromagnetic slurry 300 based on tension measurements received from the tension measuring device. A higher tension measurement means the magnetic source 303 experiences a stronger attractive force to the ferromagnetic slurry 300, because a higher magnetic force is exerted upon the magnetic source 303 indicating a higher magnetic permeability of the ferromagnetic slurry 300. The computing device 309 is calibrated to detect cementing fluids corresponding to certain ranges of force measurements (i.e., that the tension measurements satisfy a detection criterion) at operational conditions downhole or corresponding to an increase or decrease in the force measurements where the change is above or below thresholds. When a cementing fluid is detecting corresponding to the end of reverse cementing operations, the computing device 309 sends a signal to an actuating mechanism (not pictured) to stop the fluid flow.

Figure 4:
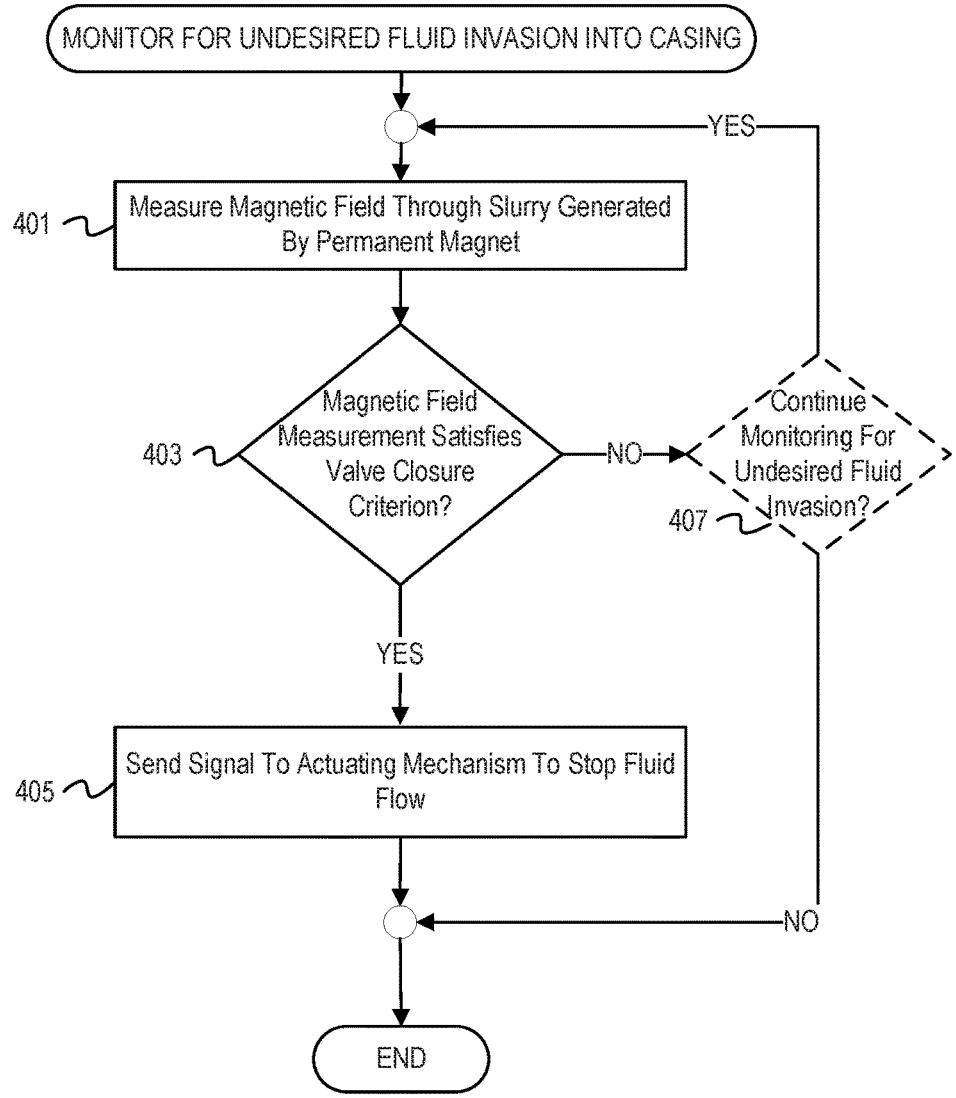
FIG. 4 is a flowchart of example operations for detecting cementing fluid downhole using a permanent magnet and stopping fluid flow.

FIG. 4 is a flowchart of example operations for monitoring for undesired fluid invasion into a downhole oilfield tubular. This monitoring uses the disclosed sensing apparatus, which includes a magnet source and a magnetic sensor. In the context of reverse cementing operations, the undesired fluid invasion is by a cementing mixture within a slurry. In the context of gravel packing, the undesired fluid invasion is a gravel-laden slurry. In the context of wellbore cleanup, the undesired fluid invasion is a mud. The operations in FIG. 4 are described with reference to a magnetic field sensor and a computing device. These names are for reading convenience and the operations in FIG. 4 can be performed by any component with the functionality described below.

At block 401, the magnetic sensor measures a magnetic field(s) through a window into the downhole oilfield tubular. Note that one or more magnetic field sensors could be used. In one application, a plurality of magnetic field sensors is used in order to determine the flow direction. The magnetic field is generated by a permanent magnet or by an electromagnetic. The magnetic field sensor measures the magnetic field that flows from the magnetic source, through the window, and back to the magnetic field sensor. The strength of the measured magnetic field is correlated with the magnetic permeability of the nearby fluid—a fluid with a higher magnetic permeability increases the strength of the magnetic field measured by the magnetic field sensor. The magnetic field sensor can continuously measure magnetic fields or can take measurements according to a schedule (e.g., every minute). The sensing apparatus can begin monitoring for undesired fluid invasion in response to a control signal, a change in temperature, an acoustic signal, or equivalent. For instance, the magnetic sensor or the computing device can receive a signal from the surface to begin measurements at the beginning of reverse cementing operations to preserve battery power. In another instance, the magnetic sensor or the computing device could note a change in the ambient temperature or note a change in the ambient acoustic noise that indicates a need to start measurements, such as from the circulation of a cementing fluid that is lower than the formation temperature.

At block 403, a computing device communicatively coupled to the magnetic sensor determines whether the magnetic measurement satisfies a criterion for changing the restriction of a valve. As examples, a valve closure criterion can indicate a specified value(s) or a specified range(s) of magnetic field strength. The magnetic sensor transmits measurements of the magnetic strength to the computing device. The computing device receives the measurements and determines whether the target cementing fluid (e.g., a spacer fluid) is present proximate the magnetic sensor. This determination can be based on magnetic field strength being within a certain range of magnetic field strengths known to correspond to a cementing fluid for operational conditions downhole. Alternatively, the determination can be based on a change in magnetic flux above a threshold magnitude. Alternatively, the determination can be based on a pattern of an increase in the magnetic flux followed by a decrease in the magnetic flux during a specified time interval. The computing device can be calibrated to detect multiple types of cementing fluids corresponding to multiple ranges of magnetic flux or based on changes of measured magnetic flux. For instance, the computing device can detect a first cementing fluid and, after an increase of measured magnetic flux above a threshold, can detect a second cementing fluid. Alternatively, after detecting a first cementing fluid the computing device can detect a second cementing fluid based on a decrease of measured magnetic flux above a first threshold and below a second threshold. If the magnetic field measurement satisfies the valve closure criterion, operations continue to block 405. Otherwise, operations continue to block 407.

At block 405, the computing device sends a signal to an actuating mechanism to restrict the fluid flow downhole. The actuating mechanism is located proximate a radial flow port that allows fluid to flow from outside an oilfield tubular to inside the oilfield tubular during reverse cementing operations. The computing device is communicatively coupled to the actuating mechanism and, preferably, in close proximity to the actuating mechanism to minimize delay in the signal and to reduce the chance of communication malfunction. In one embodiment, the actuating mechanism can be as close as 1 inch away from the radial flow port or as far away as 100 feet from the flow port.

At block 407, the computing device determines whether the sensing apparatus should continue to monitor for changes in the magnetic permeability of the fluid. The block 407 is depicted with a dashed line since this determination may be implicit or may be based on an interrupting event (e.g., a message or signal to terminate the monitoring). In some embodiments, determination of whether to continue monitoring may be based on a timing mechanism or a predefined schedule. In some embodiments, there may be a plurality of radial flow ports and plurality of actuating mechanisms.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 401 and 403 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 5:
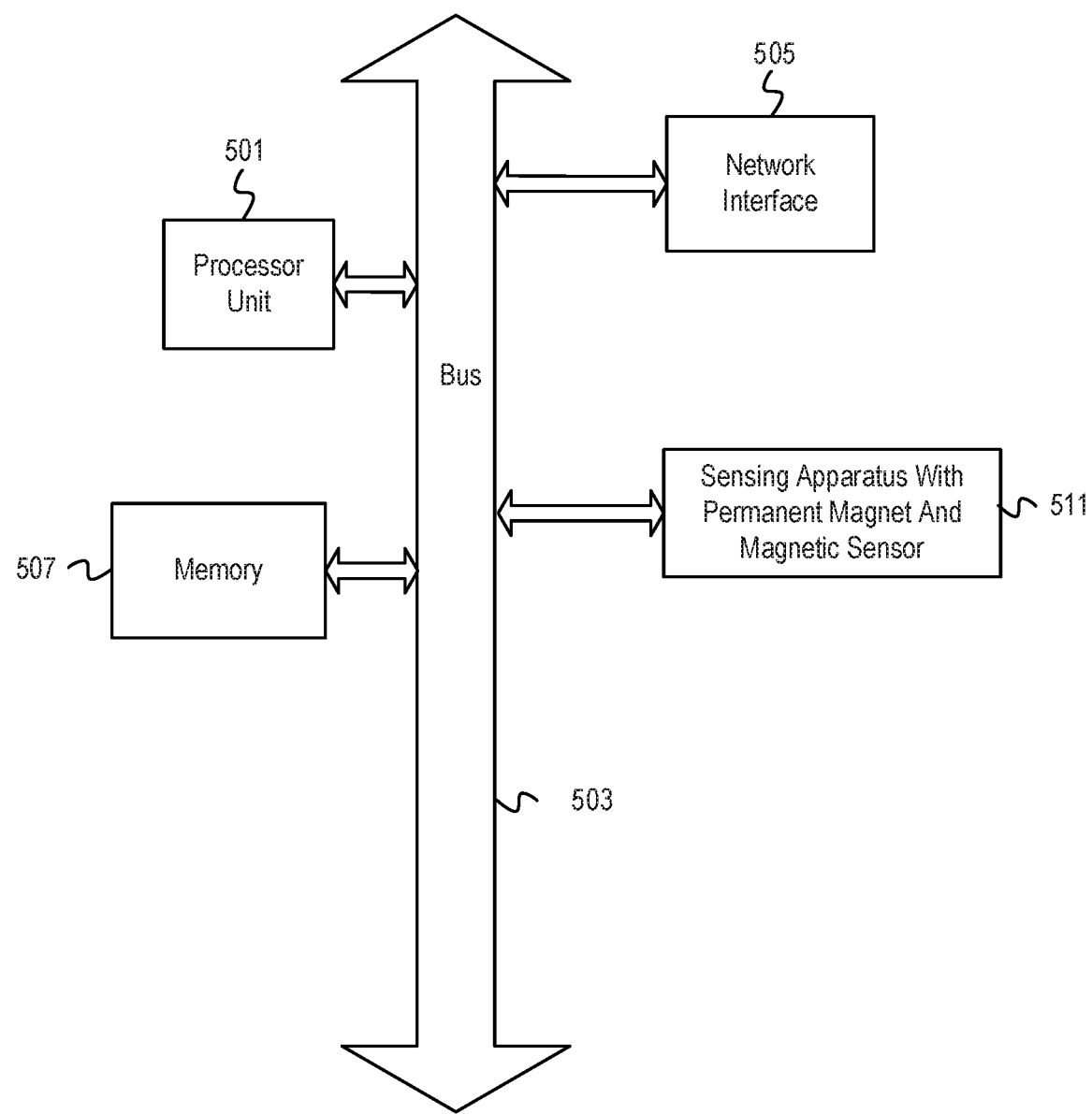
FIG. 5 depicts an example computer system with a sensing apparatus comprising a permanent magnet and a magnetic field sensor.

FIG. 5 depicts an example computer system with a sensing apparatus comprising a permanent magnet and a magnetic field sensor. The computer system includes a processor 501 (possibly including multiple processors, multiple cores, multiple nodes, and/or implementing multithreading, etc.). The computer system includes memory 507. The memory 507 may be system memory or any one or more of the above already described possible realizations of machine-readable media. The computer system also includes a bus 503 and a network interface 505. The system communicates via transmissions to and/or from remote devices via the network interface 1005 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.). The system also includes a sensing apparatus with a permanent magnet and magnetic sensor 511. The sensing apparatus 511 detects the presence of ferromagnetic material in a slurry based on the magnetic field emitted by the permanent magnet and magnetic flux readings by the magnetic field sensor as described variously above. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

Example Drilling Application

Figure 6:
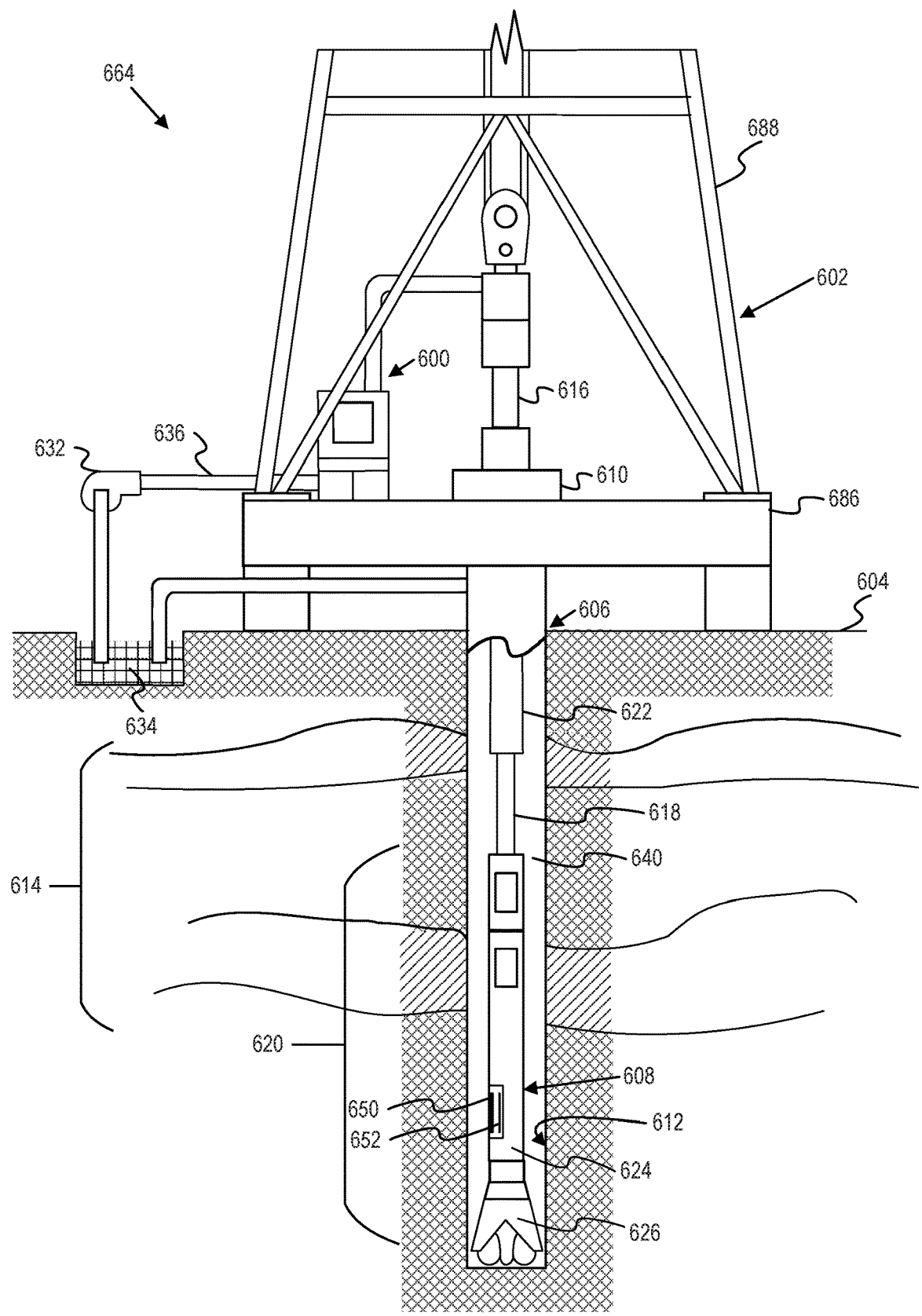
FIG. 6 is a schematic diagram of a drilling rig system with a magnetic field sensor and a permanent magnet.

FIG. 6 is a schematic diagram of a drilling rig system with a magnetic field sensor and a permanent magnet. For example, in FIG. 6 it can be seen how a system 664 may also form a portion of a rig 602 located at the surface 604 of a well 606. Drilling, testing, and production of oil and gas wells is commonly carried out using a string of pipes connected together so as to form a tubular string 608 that is lowered through a rotary table 610 into a wellbore or borehole 612. Here a rig platform 686 is equipped with a derrick 688 that supports a hoist.

The rig 602 may thus provide support for the tubular string 608. The tubular string 608 may operate to penetrate the rotary table 610 for drilling the borehole 612 through subsurface formations 614. The tubular string 608 may include a Kelly 616, drill pipe 618, and a bottom hole assembly 620, perhaps located at the lower portion of the drill pipe 618.

The bottom hole assembly 620 may include drill collars 622, a down hole tool 624, and a drill bit 626. The drill bit 626 may operate to create a borehole 612 by penetrating the surface 604 and subsurface formations 614. The down hole tool 624 may comprise any of a number of different types of tools including MWD tools, LWD tools, and others During drilling operations, the tubular string 608 (perhaps including the Kelly 616, the drill pipe 618, and the bottom hole assembly 620) may be rotated by the rotary table 610. In addition to, or alternatively, the bottom hole assembly 620 may also be rotated by a motor (e.g., a mud motor) that is located down hole. The drill collars 622 may be used to add weight to the drill bit 626. The drill collars 622 may also operate to stiffen the bottom hole assembly 620, allowing the bottom hole assembly 620 to transfer the added weight to the drill bit 626, and in turn, to assist the drill bit 626 in penetrating the surface 604 and subsurface formations 614.

During drilling operations, a mud pump 632 may pump drilling fluid (sometimes known by those of ordinary skill in the art as "drilling mud") from a mud pit 634 through a hose 636 into the drill pipe 618 and down to the drill bit 626. The drilling fluid can flow out from the drill bit 626 and be returned to the surface 604 through an annular area 640 between the drill pipe 618 and the sides of the borehole 612. The drilling fluid may then be returned to the mud pit 634, where such fluid is filtered. In some embodiments, the drilling fluid can be used to cool the drill bit 626, as well as to provide lubrication for the drill bit 626 during drilling operations. Additionally, the drilling fluid may be used to remove subsurface formation 614 cuttings created by operating the drill bit 626. It is the images of these cuttings that many embodiments operate to acquire and process. The drill pipe further comprises a permanent magnet 650 and a magnetic field sensor 652 configured to measure magnetic flux of a slurry inside of the tubular string 608 generated by the magnetic field of the permanent magnet 650 and detect cementing fluids or other operational fluids downhole.

Example Wireline Application

Figure 7:
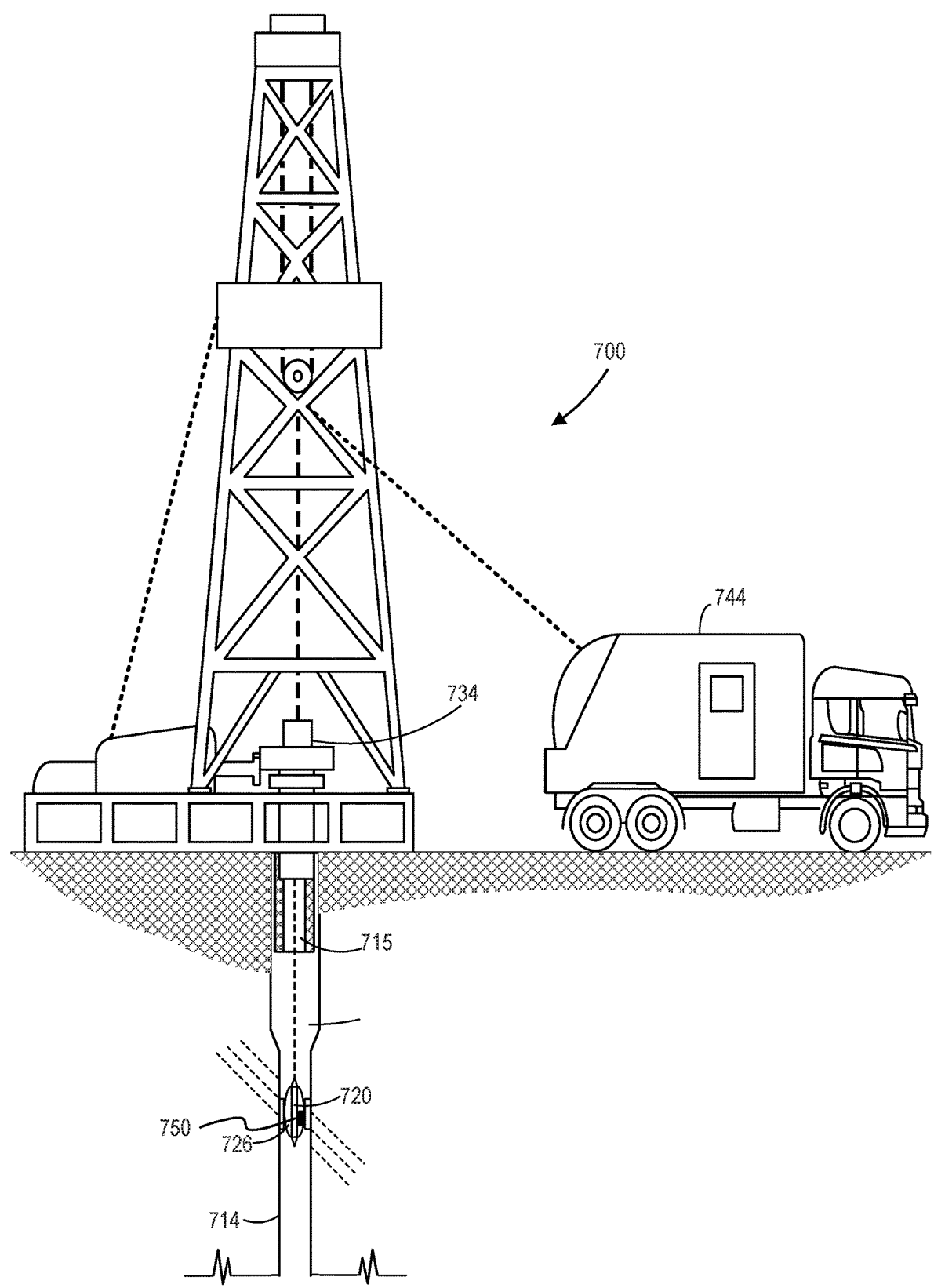
FIG. 7 depicts a schematic diagram of a wireline system with a permanent magnet and magnetic field sensor.

FIG. 7 depicts a schematic diagram of a wireline system with a permanent magnet and magnetic field sensor. A system 700 can be used in an illustrative logging environment with a drillstring removed, in accordance with some embodiments of the present disclosure.

Subterranean operations may be conducted using a wireline system 720 once the drillstring has been removed, though, at times, some or all of the drillstring may remain in a borehole 714 during logging with the wireline system 720. The wireline system 720 may include one or more logging tools 726 that may be suspended in the borehole 714 by a conveyance 715 (e.g., a cable, slickline, or coiled tubing). The logging tool 726 may be communicatively coupled to the conveyance 715. The conveyance 715 may contain conductors for transporting power to the wireline system 720 and telemetry from the logging tool 726 to a logging facility 744. Alternatively, the conveyance 715 may lack a conductor, as is often the case using slickline or coiled tubing, and the wireline system 720 may contain a control unit 734 that contains memory, one or more batteries, and/or one or more processors for performing operations and storing measurements. A sensing apparatus 750 comprising a permanent magnet and a magnetic field sensor are affixed to the logging tool 726 and can measure magnetic flux of slurry downhole. The logging tool 726 can detect the presence of a ferromagnetic material based on the measured magnetic flux, as described variously above.

In certain embodiments, the control unit 734 can be positioned at the surface, in the borehole (e.g., in the conveyance 715 and/or as part of the logging tool 726) or both (e.g., a portion of the processing may occur downhole and a portion may occur at the surface). The control unit 734 may include a control system or a control algorithm. In certain embodiments, a control system, an algorithm, or a set of machine-readable instructions may cause the control unit 734 to generate and provide an input signal to one or more elements of the logging tool 726, such as the sensors along the logging tool 726. The input signal may cause the sensors to be active or to output signals indicative of sensed properties. The logging facility 744 (shown in FIG. 7 as a truck, although it may be any other structure) may collect measurements from the logging tool 726, and may include computing facilities for controlling, processing, or storing the measurements gathered by the logging tool 726. The computing facilities may be communicatively coupled to the logging tool 726 by way of the conveyance 715 and may operate similarly to the control unit 734. In certain example embodiments, the control unit 734, which may be located in logging tool 726, may perform one or more functions of the computing facility.

The logging tool 726 includes a mandrel and a number of extendible arms coupled to the mandrel. One or more pads are coupled to each of the extendible arms. Each of the pads have a surface facing radially outward from the mandrel. Additionally, at least sensor disposed on the surface of each pad. During operation, the extendible arms are extended outwards to a wall of the borehole to extend the surface of the pads outward against the wall of the borehole. The sensors of the pads of each extendible arm can detect image data to create captured images of the formation surrounding the borehole.

Example Magnetic Permeability Sensing Apparatus

Figure 8:
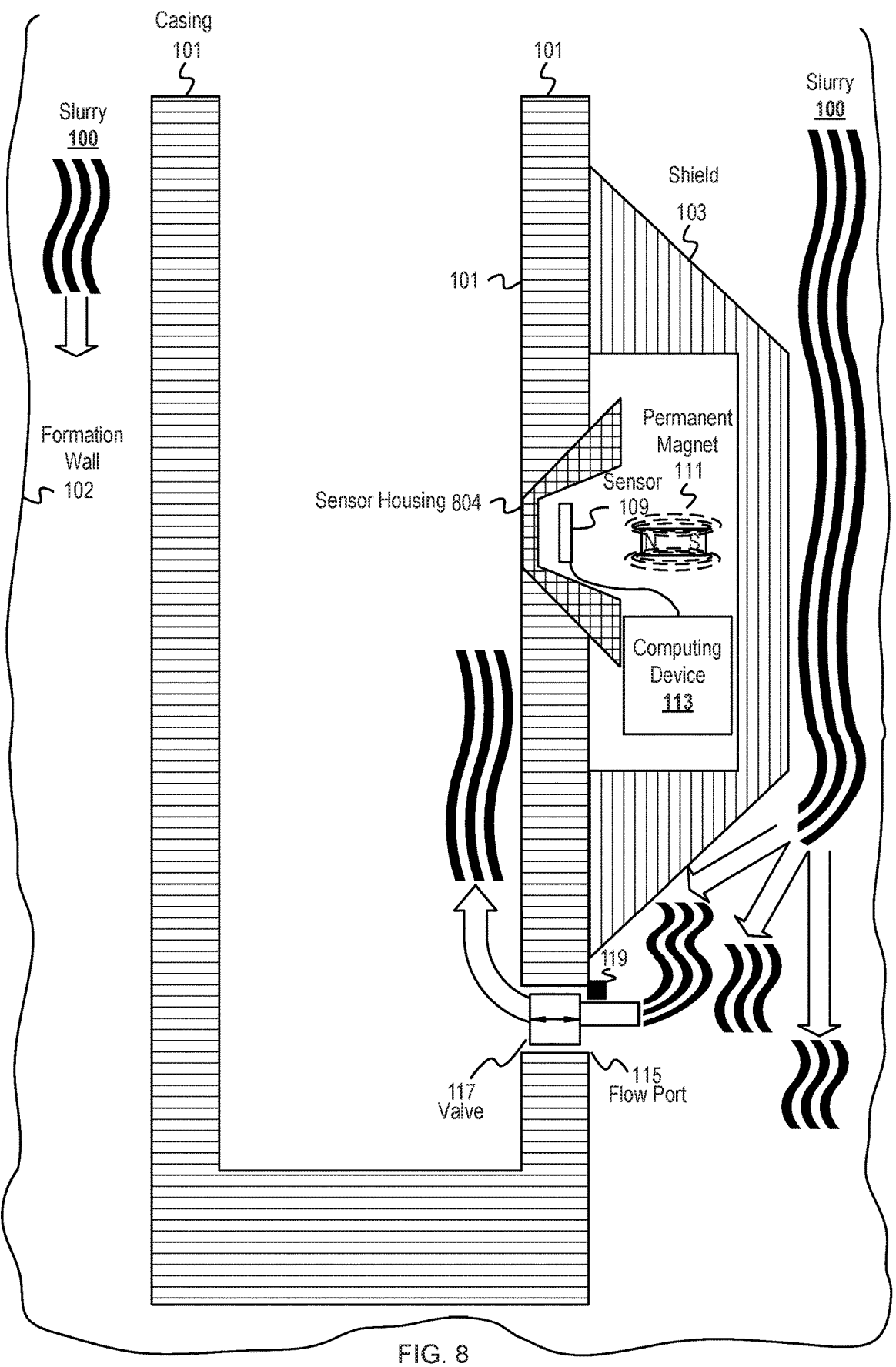
FIG. 8 is a schematic diagram of a magnetic permeability sensor in a reverse cementing operation without a non-ferromagnetic plug.

FIG. 8 is a schematic diagram of a magnetic permeability sensor in a reverse cementing operation without a non-ferromagnetic plug. The schematic diagram depicted in FIG. 8 is substantially similar to the schematic diagram depicted in FIG. 1 except that the sensor housing 804 does not comprise a plug made of a non-ferromagnetic material. Unlike the sensor housing 105, the sensor housing 804 does not have a hole or thread to insert a plug. In some embodiments, the sensor housing 804 comprises a non-ferromagnetic material instead of a plug, and magnetic flux generated by the permanent magnet 111 flows through the sensor housing 804, the slurry 100, and back to the magnetic sensor 109. Alternatively, when the sensor housing 804 is not made of a non-ferromagnetic material, the permanent magnet 111 can be a source of stronger magnetic flux so that magnetic flux generated by the permanent magnet is able to flow through the sensor housing 804, to the slurry 100, and back to the magnetic sensor 109.

Example Reverse Cementing Application

Figure 9:
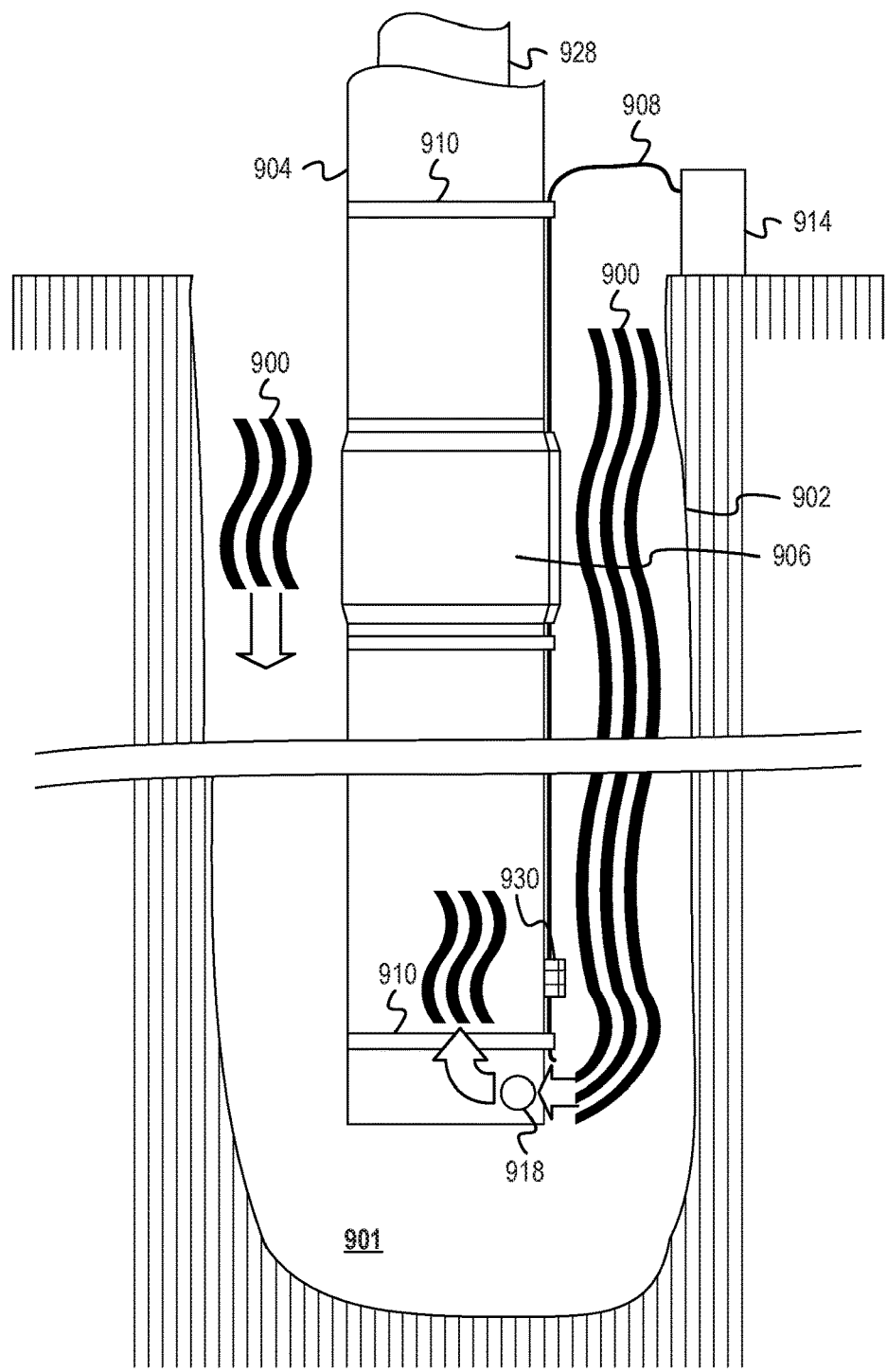
FIG. 9 is a schematic of a reverse cementing operation with a magnetic permeability sensing apparatus.

FIG. 9 is a schematic of a reverse cementing operation with a magnetic permeability sensing apparatus. An oilfield tubular 904 runs down a borehole 901 that has been drilled into the earth and that has a borehole wall 902. During cementing operations in the borehole 901, a slurry 900 circulates down the outside of the oilfield tubular 904 and inside the borehole wall 902 towards a valve 918 at the bottom of the oilfield tubular 904. A measurement unit 914 at the surface is communicatively coupled via a wire 908 to various sensors that include a magnetic permeability sensing apparatus 930. The oilfield tubular 904 is formed from lengths of tubing joined by threaded joints 906 and runs the wire 908 downhole with straps 910. As the slurry 900 enters the inside of the oilfield tubular 904, the magnetic permeability sensing apparatus 930 sends a signal to the measurement unit 914 indicating the presence of the slurry 900 inside of the oilfield tubular 904. In response, the measurement unit 914 sends a signal to an actuating mechanism to close the valve 918 and/or terminate/suspend cementing operations. Additionally, the measurement unit 914 can send a signal to an inner liner 928 that runs down the inside of the oilfield tubular 904. The signal causes the inner liner 928 to circulate unnecessary slurry 900 out of the inside of the oilfield tubular 904.

Although depicted with a wire 908 communicatively coupled to the magnetic permeability sensing apparatus 930 and the measurement unit 914, the magnetic permeability sensing apparatus 930 can be communicatively coupled to an actuating mechanism for the valve 918 and can be configured to send a signal to the actuating mechanism to close the valve 918 in response to detecting the presence of the slurry 900. Furthermore, the inner liner 928 can be communicatively coupled to the magnetic permeability sensing apparatus 930 downhole. The magnetic permeability sensing apparatus 930 can send a signal to circulate excess slurry 900 out of the oilfield tubular 904 with the inner liner 928. The wire 908 can run downhole with small diameter tubing or a rigid housing, and multiple wires can be implemented for redundancy. In embodiments where the magnetic permeability sensing apparatus 930 is coupled to the valve 918, the wire 908 is not required.

The slurry 900 can comprise a cementing fluid such as a cement slurry, a spacer, a brine, a mud, or any fluid used during the cementing process (e.g. to cement the outside of the oilfield tubular 904 or to clean cuttings out of the borehole due to drilling). Each cementing fluid in the slurry 900 has a magnetic permeability and the magnetic permeability of each fluid can be modified by adding ferromagnetic material of a prespecified concentration. Modifying one of the cementing fluids, two of the cementing fluids, or all of the cementing fluids are all anticipated by the present disclosure. The measurement unit 914 can be further communicatively coupled to an array of sensors downhole that can measure temperature, pressure, strain, acoustic (noise) spectra, acoustic coupling, chemical (e.g., hydrogen or hydroxyl) concentration, etc. and the wire 908 can be an optic fiber configured for distributed acoustic sensing. Measurements taken by sensors downhole can be used by a controller to guide reverse cementing operations. The magnetic permeability sensing apparatus 930 is depicted as facing towards the inside of the oilfield tubular 904, however the magnetic permeability sensing apparatus 930 can alternatively face the outside of the oilfield tubular 904 to detect the slurry 900 before it enters the inside of the oilfield tubular 904.

While the aspects of the disclosure are described with reference to various implementations and exploitations, it will be understood that these aspects are illustrative and that the scope of the claims is not limited to them. In general, techniques for detecting magnetic permeability of a sample fluid by measuring the magnetic flux of a magnetic field emitted by a permanent magnet as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Embodiment 1: An apparatus comprising a housing that houses a magnetic field sensor, wherein the housing is adapted to integrate into an oilfield tubular, a source of magnetic flux, a magnetic sensor housed within the housing and situated to measure magnetic flux generated by the source of magnetic flux, and a computing device communicatively coupled to the magnetic sensor and programmed to, determine whether a magnetic measurement transmitted from the magnetic sensor satisfies at least a first detection criterion, and indicate presence of a first fluid based on a determination that the magnetic measurement satisfies the first detection criterion which corresponds to a first magnetic permeability associated with the first fluid.

Embodiment 2: The apparatus of Embodiment 1, further comprising a shield to protect the housing, the magnetic flux source, the magnetic sensor, and the computing device.

Embodiment 3: The apparatus of any of Embodiments 1-2, wherein the source of magnetic flux is attached to the shield or the housing.

Embodiment 4: The apparatus of any of Embodiments 1-3, wherein the first fluid comprises a fluid for a reverse cementing operation.

Embodiment 5: The apparatus of any of Embodiments 1-4, wherein the computing device programmed to determine whether a magnetic measurement transmitted from the magnetic sensor satisfies at least a first detection criterion comprises the computing device programmed to determine whether the magnetic measurement is within a first range of magnetic measurements corresponding to the first magnetic permeability.

Embodiment 6: The apparatus of any of Embodiments 1-5, wherein the computing device programmed to determine whether a magnetic measurement transmitted from the magnetic sensor satisfies a detection criterion comprises the computing device programmed to determine whether the magnetic measurement changes above a threshold amount.

Embodiment 7: The apparatus of any of Embodiments 1-6, wherein the computing device programmed to indicate presence of the first fluid comprises the computing device being programmed to send a signal to an actuating mechanism to stop fluid flow into an oilfield tubular to which the housing is integrated.

Embodiment 8: The apparatus of any of Embodiments 1-7, wherein the computing device programmed to determine whether a magnetic measurement transmitted from the magnetic sensor satisfies at least a first detection criterion comprises the computing device programmed to determine whether the magnetic measurement satisfies a second detection criterion which corresponds to a second magnetic permeability associated with a second fluid.

Embodiment 9: The apparatus of any of Embodiments 1-8, where the magnetic sensor comprises one of a GMR sensor, a force sensor, and a Hall sensor.

Embodiment 10: The apparatus of any of Embodiments 1-9, wherein the magnetic measurement comprises one of magnetic flux, magnetic field, and magnetic force.

Embodiment 11: The apparatus of any of Embodiments 1-10, wherein the magnetic sensor is attached to the housing.

Embodiment 12: The apparatus of any of Embodiments 1-11, further comprising a pair of magnetic amplifiers that focus a magnetic field generated by the source of magnetic flux.

Embodiment 13: The apparatus of any of Embodiments 1-12, further comprising a non-ferromagnetic plug inserted into the housing, wherein the non-ferromagnetic plug provides a window into an interior of an oilfield tubular into which the housing is integrated.

Embodiment 14: An apparatus comprising an oilfield tubular, a housing at least partially integrated into the oilfield tubular, a source of magnetic flux, a magnetic sensor housed within the housing and situated to measure the magnetic flux generated by the source of magnetic flux, and a computing device coupled to the magnetic sensor programmed to determine whether a magnetic measurement transmitted from the magnetic sensor satisfies at least a first detection criterion, and indicate presence of a first fluid based on a determination that the magnetic measurement satisfies the first detection criterion which corresponds to a first magnetic permeability associated with the first fluid.

Embodiment 15: The apparatus of Embodiment 14, wherein the computing device programmed to determine whether a magnetic measurement transmitted from the magnetic sensor satisfies at least a first detection criterion comprises the computing device programmed to determine whether the magnetic measurement is within a first range of magnetic measurements corresponding to the first magnetic permeability.

Embodiment 16: The apparatus of any of Embodiments 14-15, wherein the computing device programmed to determine whether a magnetic measurement transmitted from the magnetic sensor satisfies a detection criterion comprises the computing device programmed to determine whether the magnetic measurement changes above a threshold amount.

Embodiment 17: The apparatus of any of Embodiments 14-16, wherein the computing device programmed to indicate presence of the first fluid comprises the computing device programmed to send a signal to an actuating mechanism to stop fluid flow into the oilfield tubular.

Embodiment 18: An apparatus comprising a housing that houses a magnetic sensor and that comprises a plug made of a ferromagnetic material, wherein the housing is adapted to integrate into an oilfield tubular with the plug providing a window into an interior of the oilfield tubular, a source of magnetic flux, a magnetic sensor housed within the housing and located between the source of magnetic flux and the plug, a computing device communicatively coupled to the magnetic sensor and programmed to determine whether a magnetic measurement transmitted from the magnetic sensor satisfies at least a first detection criterion, and indicate presence of a first fluid based on a determination that the magnetic measurement satisfies the first detection criterion which corresponds to a first magnetic permeability associated with the first fluid, and a shield to protect the housing, the source of magnetic flux, the magnetic sensor, and the computing device.

Embodiment 19: The apparatus of Embodiment 18, wherein the computing device programmed to determine whether a magnetic measurement transmitted from the magnetic sensor satisfies at least a first detection criterion comprises the computing device programmed to determine whether the magnetic measurement is within a first range of magnetic measurements corresponding to the first magnetic permeability.

Embodiment 20: The apparatus of any of Embodiments 18-19, wherein the computing device programmed to determine whether a magnetic measurement transmitted from the magnetic sensor satisfies a detection criterion comprises the computing device programmed to determine whether the magnetic measurement changes above a threshold amount.

What is claimed is:

1. An apparatus comprising:
a housing adapted to integrate into an oilfield tubular;
a magnet positioned between the tubular and a formation wall to generate a magnetic field;
a magnetic sensor positioned between the magnet and the housing to measure a change in the magnetic field; and
a computing device communicatively coupled to the magnetic sensor and programmed to determine that the change in the magnetic field measured by the magnetic sensor indicates a presence of a magnetic material within an interior of the tubular and proximate the housing.

2. The apparatus of claim 1, further comprising a shield surrounding the housing, the magnet, the magnetic sensor, and the computing device.

3. The apparatus of claim 2, wherein the magnet is attached to the shield or the housing.

4. The apparatus of claim 1, wherein the magnetic material within the interior of the tubular is a first fluid for a reverse cementing operation.

5. The apparatus of claim 1, wherein the computing device is programmed to determine that the change in the magnetic field indicates a change in a magnetic permeability of a first fluid used in a reverse cementing operation.

6. The apparatus of claim 5, wherein the change in the magnetic permeability of the first fluid indicates that the reverse cementing operations may be stopped.

7. The apparatus of claim 6, wherein the computing device is further programmed to send a signal to an actuating mechanism to stop fluid flow of the first fluid into the tubular.

8. The apparatus of claim 1, wherein the magnetic material within the interior of the tubular is a second fluid.

9. The apparatus of claim 1, where the magnetic sensor comprises one of a GMR sensor, a force sensor, and a Hall sensor.

10. The apparatus of claim 1, wherein the magnetic field comprises one of magnetic flux and magnetic force.

11. The apparatus of claim 1, wherein the magnetic sensor is attached to the housing.

12. The apparatus of claim 1, further comprising a pair of magnetic amplifiers that focus a magnetic field generated by the magnet.

13. The apparatus of claim 1 further comprising a non-ferromagnetic plug inserted into the housing, wherein the non-ferromagnetic plug provides a window into the interior of the tubular.

14. An apparatus comprising:
an oilfield tubular having a flow port in a downhole end;
a housing at least partially integrated into the oilfield tubular and positioned uphole of the flow port;
a magnet positioned between the tubular and a formation wall to generate a magnetic field;
a magnetic sensor positioned between the magnet and the housing, configured to measure a change in the magnetic field; and
a computing device coupled to the magnetic sensor programmed to determine that the change in the magnetic field measured by the magnetic sensor indicates a presence of a magnetic material within an interior of the tubular and proximate the housing.

15. The apparatus of claim 14, further comprising a shield positioned between the magnet and the formation wall.

16. The apparatus of claim 14, wherein the computing device programmed to determine that the change in the magnetic field indicates a change in a magnetic permeability of a first fluid used in a reverse cementing operation.

17. The apparatus of claim 16, wherein the computing device is further programmed to send a signal to an actuating mechanism to stop fluid flow of the first fluid into the tubular.

18. A method, the method comprising:
receiving a measured change in a magnetic field from an apparatus integrated into a tubular positioned in a wellbore, the apparatus comprising:
a housing integrated into the tubular;
a magnet positioned between the tubular and a formation wall to generate the magnetic field;
a magnetic sensor positioned between the magnet and the housing to measure the change in the magnetic field; and
a computing device communicatively coupled to the magnetic sensor and programmed to determine a change in the magnetic field measured by the magnetic sensor, determine that the change in the magnetic field measured by the magnetic sensor indicates a presence of a magnetic material within an interior of the tubular and proximate the housing.

19. The method according to claim 18, wherein the computing device is further programmed to determine that the change in the magnetic field indicates a change in a magnetic permeability of a first fluid flowing into the tubular.

20. The method according to claim 18, further comprising sending a signal to an actuating mechanism to stop fluid flow of the first fluid into the tubular.

* * * * *